(12) United States Patent
Hasuike et al.

(10) Patent No.: US 10,496,959 B2
(45) Date of Patent: Dec. 3, 2019

(54) DATA PROCESSING APPARATUS, DATA PROCESSING SYSTEM, DATA PROCESSING METHOD, AND NON-TRANSITORY COMPUTER READABLE MEDIUM

(75) Inventors: Kimitake Hasuike, Kanagawa (JP); Yasuhiro Hirano, Kanagawa (JP)

(73) Assignee: FUJI XEROX CO., LTD., Minato-ku, Tokyo (JP)

( * ) Notice: Subject to any disclaimer, the term of this patent is extended or adjusted under 35 U.S.C. 154(b) by 1031 days.

(21) Appl. No.: 13/568,477

(22) Filed: Aug. 7, 2012

(65) Prior Publication Data

US 2013/0262551 A1 Oct. 3, 2013

(30) Foreign Application Priority Data

Mar. 30, 2012 (JP) ................ 2012-081633

(51) Int. Cl.
*G06Q 10/10* (2012.01)
*G06F 17/24* (2006.01)

(52) U.S. Cl.
CPC .......... *G06Q 10/101* (2013.01); *G06F 17/24* (2013.01)

(58) Field of Classification Search
CPC ..................................................... H04L 41/12
USPC ......................................... 709/201–203, 220
See application file for complete search history.

(56) References Cited

U.S. PATENT DOCUMENTS

| | | | |
|---|---|---|---|
| 6,690,990 B1* | 2/2004 | Caron ............... | B27G 1/00 700/171 |
| 6,895,431 B1* | 5/2005 | Bero ................. | H04L 41/12 709/220 |
| 7,076,491 B2* | 7/2006 | Tsao ................. | G06F 8/71 707/999.1 |
| 8,499,036 B2* | 7/2013 | Kalthoff ............ | G06F 21/62 709/204 |
| 9,031,957 B2* | 5/2015 | Agrawal ............ | G06F 17/30286 707/741 |

(Continued)

FOREIGN PATENT DOCUMENTS

| JP | 06-295299 A | 10/1994 |
|---|---|---|
| JP | 2001-51995 A | 2/2001 |
| JP | 2002-288029 A | 10/2002 |

OTHER PUBLICATIONS

Communication dated Dec. 15, 2015 from the Japanese Patent Office issued in corresponding Application No. 2012-081633.

*Primary Examiner* — Minh Chau Nguyen
(74) *Attorney, Agent, or Firm* — Sughrue Mion, PLLC

(57) ABSTRACT

A data processing apparatus includes a data obtaining unit, a specifying unit, a change information obtaining unit, and an updating unit. The data obtaining unit obtains data specified as a target to be updated. The specifying unit specifies an operator who performs an operation on the data. The change information obtaining unit obtains change information representing details of a change performed on a portion of the data. When a predetermined update operation of updating the data in accordance with the change information is performed by the operator, the updating unit performs a first update process of changing the portion in accordance with the change information if the operator has a first right for the portion, and performs a second update process of adding a new portion to the data without changing the portion if the operator has a second right for the portion.

20 Claims, 9 Drawing Sheets

(56) References Cited

U.S. PATENT DOCUMENTS

| | | | |
|---|---|---|---|
| 2003/0167447 A1* | 9/2003 | Hatta | H04N 1/00132 |
| | | | 715/243 |
| 2006/0272033 A1* | 11/2006 | Paris | G06F 21/6218 |
| | | | 726/32 |
| 2006/0286536 A1* | 12/2006 | Mohler | G09B 5/00 |
| | | | 434/350 |
| 2007/0050360 A1* | 3/2007 | Hull | G06F 17/3002 |
| 2008/0126360 A1* | 5/2008 | Kakuta | H04L 67/24 |
| 2008/0209327 A1* | 8/2008 | Drucker | G06F 9/542 |
| | | | 715/733 |
| 2009/0125518 A1* | 5/2009 | Bailor | G06F 17/24 |
| | | | 707/999.008 |
| 2009/0300529 A1* | 12/2009 | Endoh | G06F 9/44505 |
| | | | 715/764 |
| 2010/0083136 A1* | 4/2010 | Komine | G06F 9/52 |
| | | | 715/753 |
| 2010/0122188 A1* | 5/2010 | Brun | G06F 17/30893 |
| | | | 715/763 |
| 2010/0179860 A1* | 7/2010 | Noel | G06Q 30/0204 |
| | | | 705/7.33 |
| 2011/0239132 A1* | 9/2011 | Jorasch | G06F 21/604 |
| | | | 715/752 |
| 2012/0110445 A1* | 5/2012 | Greenspan | G06F 17/2288 |
| | | | 715/256 |
| 2012/0166940 A1* | 6/2012 | Ennis | G06F 17/212 |
| | | | 715/255 |
| 2013/0198038 A1* | 8/2013 | Mowatt | G06Q 10/10 |
| | | | 705/26.41 |
| 2014/0142961 A1* | 5/2014 | Luter | G06F 19/366 |
| | | | 705/2 |
| 2015/0199411 A1* | 7/2015 | Greenspan | G06F 17/30548 |
| | | | 715/229 |

* cited by examiner

FIG. 7

| PAGE | MAIN EDITOR | SUBEDITOR |
|---|---|---|
| 1 | A | B |
| 2 | A | B |
| 3 | B | A, C |
| 4 | B | A, C |

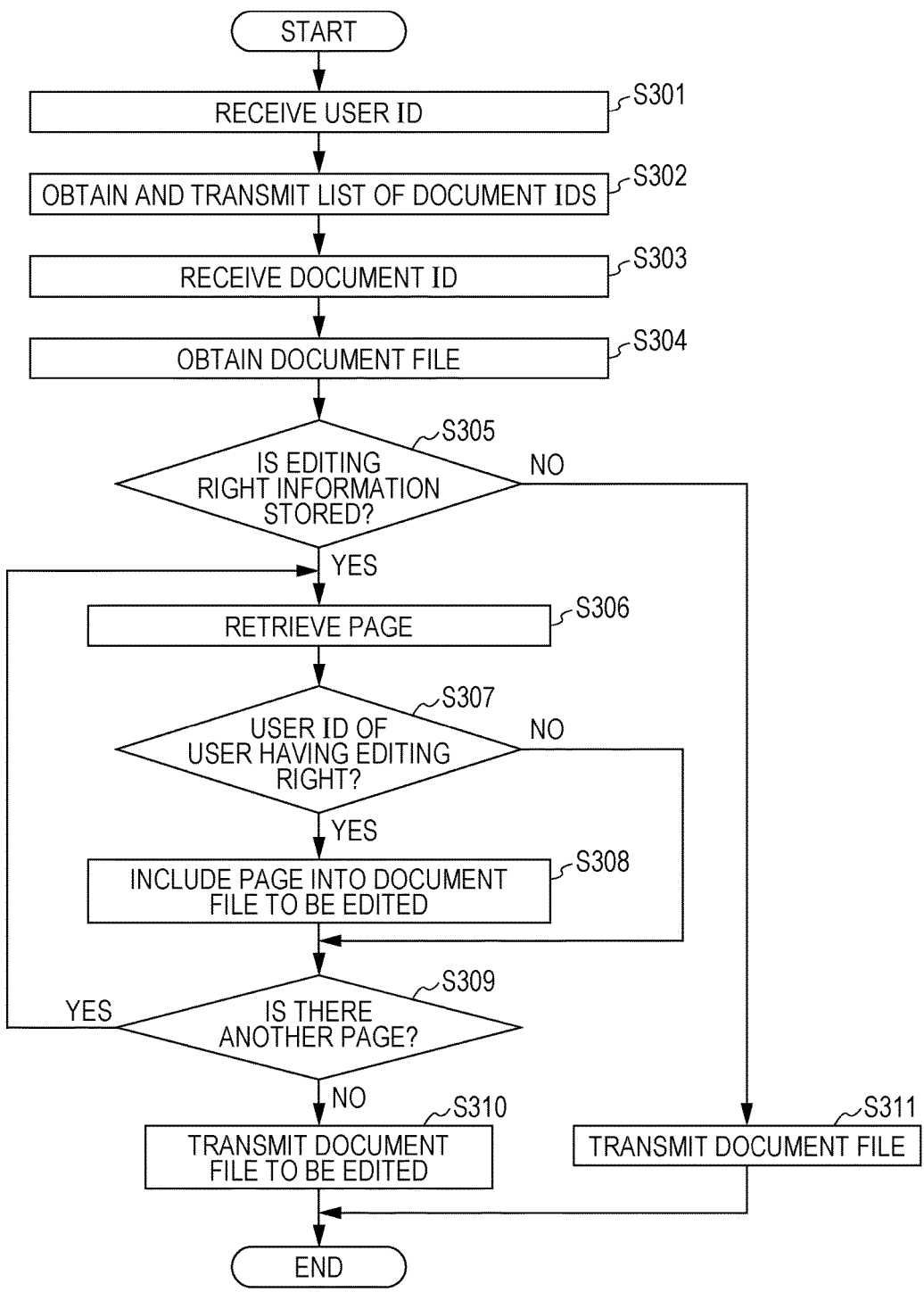

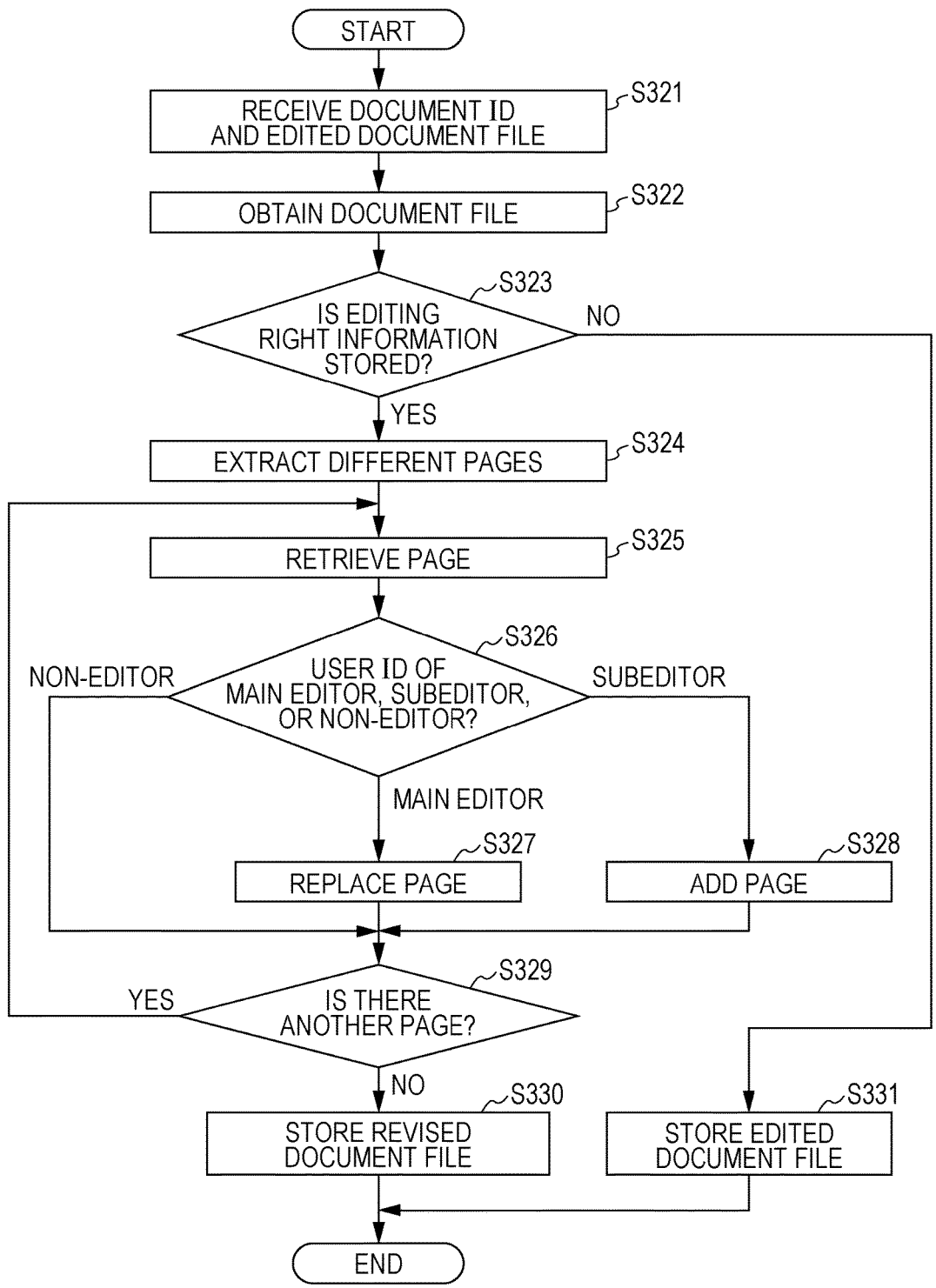

DATA PROCESSING APPARATUS, DATA PROCESSING SYSTEM, DATA PROCESSING METHOD, AND NON-TRANSITORY COMPUTER READABLE MEDIUM

CROSS-REFERENCE TO RELATED APPLICATIONS

This application is based on and claims priority under 35 USC 119 from Japanese Patent Application No. 2012-081633 filed Mar. 30, 2012.

BACKGROUND

Technical Field

The present invention relates to a data processing apparatus, a data processing system, a data processing method, and a non-transitory computer readable medium.

SUMMARY

According to an aspect of the invention, there is provided a data processing apparatus including a data obtaining unit, a specifying unit, a change information obtaining unit, and an updating unit. The data obtaining unit obtains data specified as a target to be updated. The specifying unit specifies an operator who performs an operation on the data. The change information obtaining unit obtains change information representing details of a change performed on a portion of the data. When a predetermined update operation of updating the data in accordance with the change information is performed by the operator, the updating unit performs a first update process of changing the portion of the data in accordance with the change information if the operator has a first right for the portion of the data, and performs a second update process of adding a new portion, which is obtained by changing the portion in accordance with the change information, to the data without changing the portion of the data if the operator has a second right, which is different from the first right, for the portion of the data.

BRIEF DESCRIPTION OF THE DRAWINGS

An exemplary embodiment of the present invention will be described in detail based on the following figures, wherein:

FIG. 7 is a diagram illustrating an example of editing right information stored in an editing right information memory according to the exemplary embodiment;

FIG. 8 is a flowchart illustrating an example of operation of transmitting a document file to be edited performed in the document server according to the exemplary embodiment; and FIG. 9 is a flowchart illustrating an example of operation of generating a revised document file performed in the document server according to the exemplary embodiment.

DETAILED DESCRIPTION

Hereinafter, an exemplary embodiment of the present invention will be described in detail with reference to the attached drawings.

Figure 1:
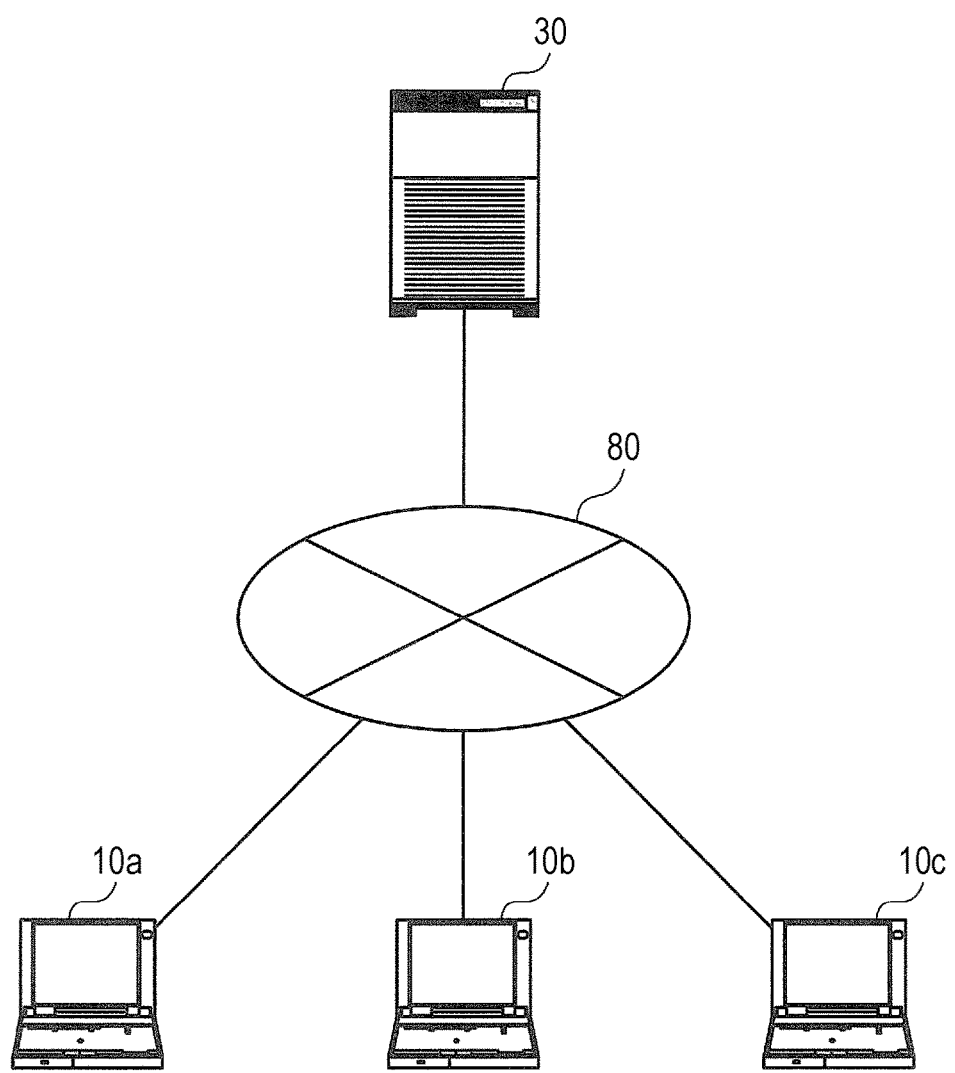
FIG. 1 is a diagram illustrating an example configuration of a computer system according to an exemplary embodiment of the present invention.

FIG. 1 illustrates an example configuration of an entire computer system according to the exemplary embodiment.

As illustrated in FIG. 1, the computer system includes client terminals 10a, 10b, and 10c and a document server 30, which are connected to one another via a network 80.

Each of the client terminals 10a, 10b, and 10c illustrated in FIG. 1 will be referred to as a client terminal 10 when it is not necessary to distinguish them from one another. Though three client terminals 10 are illustrated in FIG. 1, four or more client terminals 10 may be provided.

Each of the client terminals 10 is a computer apparatus that is used by a user to, for example, view or edit a document file. Specifically, the client terminal 10 downloads a document file from the document server 30, allows a user to view or edit the document file, and then uploads the document file to the document server 30, in response to a user operation. Here, examples of the client terminal 10 include a desktop personal computer (PC), a notebook PC, a tablet PC, a wearable computer, a personal digital assistant (PDA), a smart phone, and a mobile phone. In the exemplary embodiment, the client terminal 10 is provided as an example of an operation apparatus, a first operation apparatus, and a second operation apparatus.

The document server 30 is a computer apparatus that stores a document file on which a user performs viewing, editing, etc. Specifically, the document server 30 stores a file created by using word processor software, spreadsheet software, presentation software, or the like, or a file in a portable document format (PDF) in which an original image may be reproduced without depending on the viewing environment. Note that, in this specification, a "document file" is not always a file generated by digitalizing a "document" including text. For example, graphic data of figures or the like, and image data of pictures, photos, or the like may also be included in a "document file" regardless of whether the data is raster data or vector data. Here, a PC or the like may be used as the document server 30. In the exemplary embodiment, the document server 30 is provided as an example of a holding apparatus.

The network 80 is a communication medium used for information communication performed between each of the client terminals 10 and the document server 30, and is the Internet, for example.

Next, a hardware configuration of the client terminal 10 will be described.

Figure 2:
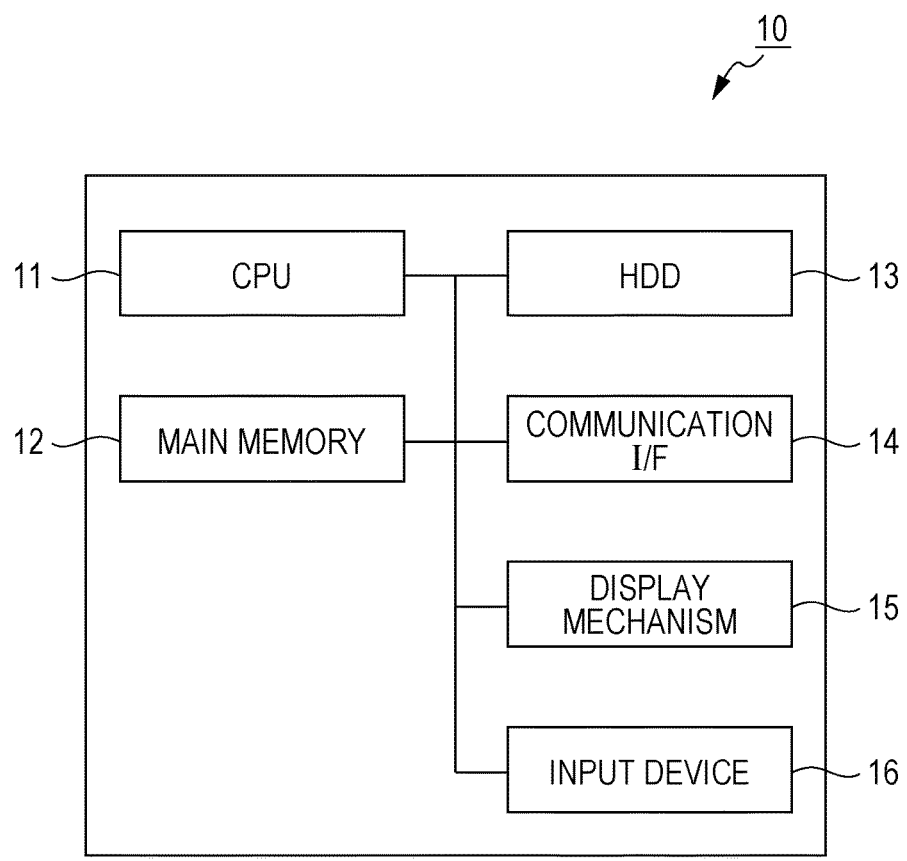
FIG. 2 is a diagram illustrating an example hardware configuration of a client terminal according to the exemplary embodiment.

FIG. 2 is a diagram illustrating an example hardware configuration of the client terminal 10.

As illustrated in FIG. 2, the client terminal 10 includes a central processing unit (CPU) 11 serving as a processor, a main memory 12 serving as a storage unit, and a hard disk drive (HDD) 13 serving as a storage unit. Here, the CPU 11 executes an operating system (OS) and various types of software such as applications, thereby realizing the various functions described below. The main memory 12 is a storage region that stores the various types of software and the data used for executing the software. The HDD 13 is a storage region that stores data input for the various types of software and data output from the various types of software. When the client terminal 10 is a smart phone or a mobile phone, a flash storage may be used instead of the HDD 13.

The client terminal 10 further includes a communication interface (hereinafter referred to as a communication I/F) 14 used for communicating with an external apparatus, a display mechanism 15 including a video memory and a display, and an input device 16 including a keyboard and a mouse.

FIG. 2 may be regarded as a diagram illustrating a hardware configuration of the document server 30. In this case, the CPU 11, the main memory 12, the HDD 13, the communication I/F 14, the display mechanism 15, and the input device 16 are replaced by a CPU 31, a main memory 32, an HDD 33, a communication I/F 34, a display mechanism 35, and an input device 36, respectively.

In the computer system illustrated in FIG. 1, viewing, editing, etc. of a document file stored in the document server 30 may be performed in parallel by plural users using the individual client terminals 10.

Particularly, when users work on a team to revise a document file in a business scene, the pages of a current draft to be revised are assigned to the users in charge so that the revision is performed in collaboration with one another.

A typical method for performing such a collaborative work is a method in which a certain user among users checks out a document file or a document element constituting the document file, and exclusive control is performed while the certain user is editing the document file or document element so that the other users are not allowed to edit the document file or document element. Here, the term "document element" means an element constituting a document file, for example, a portion constituting two pages of a document file made up of ten pages.

In such a method, however, the other users are not allowed to edit the document file or document element until the certain user checks in the document file or document element, and the work is not performed in parallel.

In the exemplary embodiment, one main editor and at least one subeditor are designated for each page of a document file. If a certain page of a document file has been edited by the main editor, the page is updated in accordance with the editing performed thereby. If the certain page has been edited by the subeditor, the edited page is added to the end of the document file.

Figure 3:
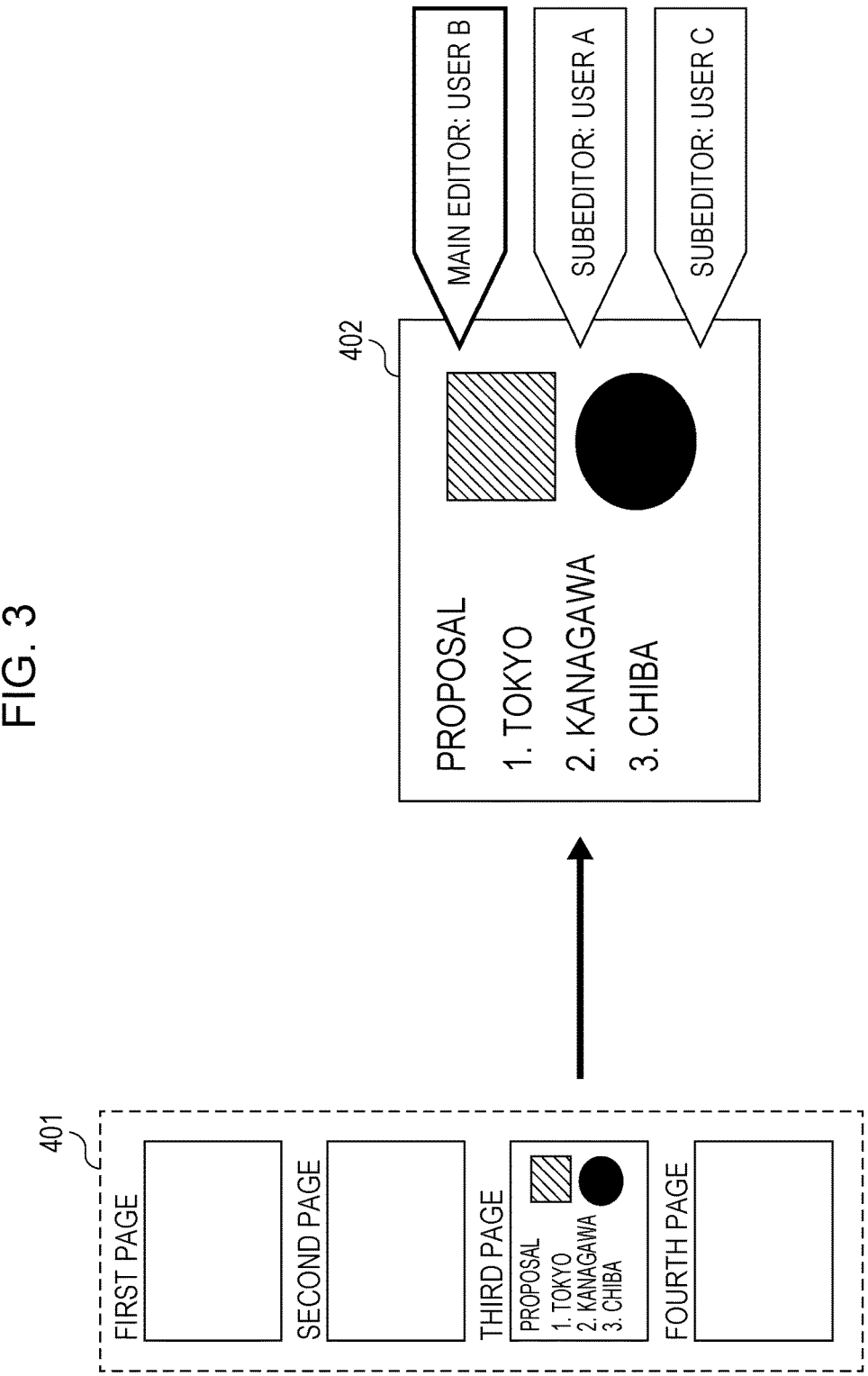
FIG. 3 is a diagram schematically illustrating an outline of the exemplary embodiment.
Figure 4:
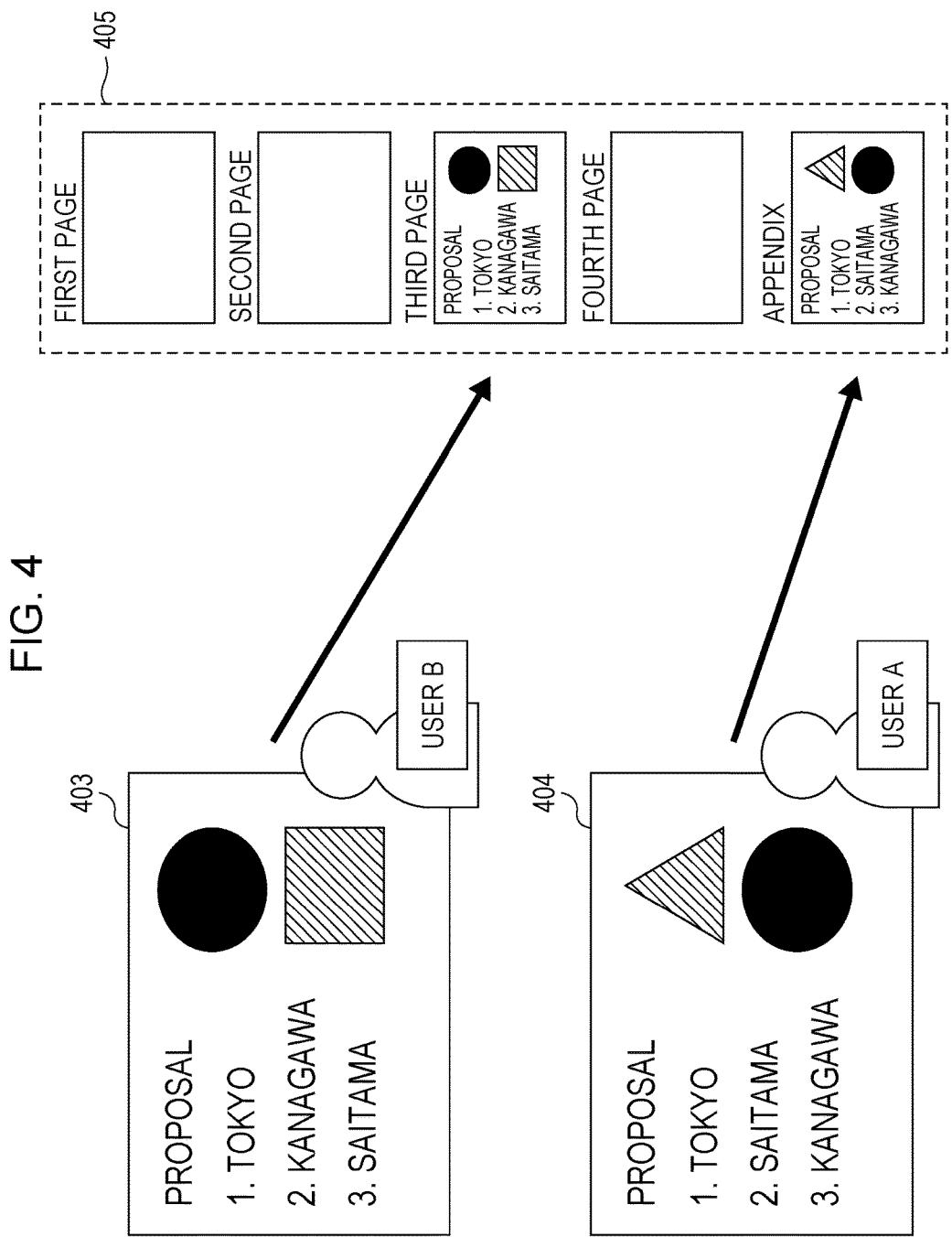
FIG. 4 is a diagram schematically illustrating the outline of the exemplary embodiment.

FIGS. 3 and 4 are diagrams schematically illustrating an outline of the exemplary embodiment. Here, a scene is assumed where users A, B, and C revise a document file 401 composed of four pages in collaboration with one another. User A is a manager of the entire document file 401 who has a right to designate a main editor and a subeditor of each page.

FIG. 3 illustrates a state where an editing right is given to the third page of the document file 401.

As illustrated in FIG. 3, user A designates user B as a main editor and designates user A and user C as subeditors, as shown in before-editing content 402 of the third page.

FIG. 4 illustrates a state where the third page of the document file 401 is edited by plural users in parallel.

Here, it is assumed that user A and user B edit the third page. Specifically, as illustrated in FIG. 4, user B edits the before-editing content 402 illustrated in FIG. 3 to create post-editing content 403, and user A edits the before-editing content 402 illustrated in FIG. 3 to create post-editing content 404.

After that, user B stores the document file 401. Since user B is a main editor, the third page of the document file 401 is revised in accordance with the post-editing content 403. Also, user A stores the document file 401. Since user A is a subeditor, the post-editing content 404 is added as an appendix to the end of the document file 401.

Accordingly, the document file 401 after revision has been performed thereon by user A and user B is stored in the form of a revised document file 405 as illustrated in FIG. 4.

Next, the configuration of the individual apparatuses according to the exemplary embodiment will be described.

Figure 5:
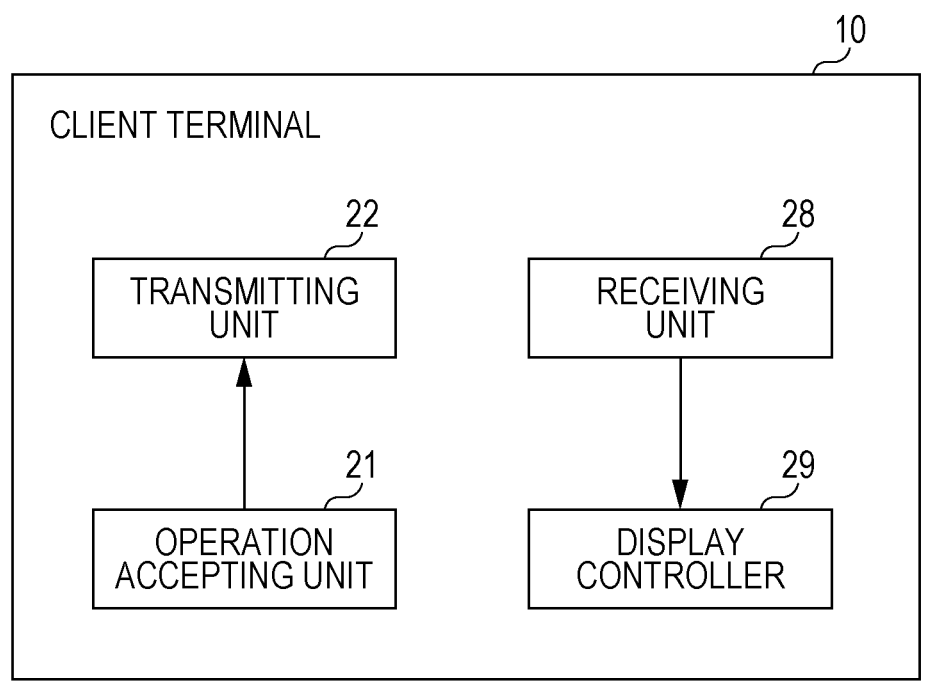
FIG. 5 is a block diagram illustrating an example functional configuration of the client terminal according to the exemplary embodiment.

FIG. 5 is a block diagram illustrating an example functional configuration of the client terminal 10.

As illustrated in FIG. 5, the client terminal 10 includes an operation accepting unit 21, a transmitting unit 22, a receiving unit 28, and a display controller 29.

The operation accepting unit 21 accepts, from a user, an operation of logging into the document server 30, an operation of selecting a document file to be viewed or edited, and an operation of transmitting a document file to be edited, which corresponds to a document file received by a user from the document server 30, to the document server 30 after the document file has been viewed or edited, etc.

The transmitting unit 22 transmits, to the document server 30, identification information of a user (hereinafter referred to as a "user ID") when the operation accepting unit 21 accepts an operation of logging into the document server 30 from the user, identification information of a document file (hereinafter referred to as a "document ID") when the operation accepting unit 21 accepts an operation of selecting the document file from a user, and a document ID of an original document file and an edited document file when the operation accepting unit 21 accepts an operation of transmitting the edited document file to the document server 30. Here, an example of a document ID may be information indicating a storage site of a document file in the document server 30. The information indicating a storage site may be, for example, a uniform resource identifier (URI). In the exemplary embodiment, a user ID is used as an example of identification information identifying an operator. An edited document file is used as an example of change information representing details of a change. The transmitting unit 22 is provided as an example of a transmitting unit that transmits identification information and change information, a first transmitting unit that transmits first change information, and a second transmitting unit that transmits second change information.

The receiving unit 28 receives, from the document server 30, a list of document IDs of document files that may be viewed or edited by a user when the transmitting unit 22 transmits the user ID of the user, and a document file to be edited corresponding to a document file stored in the site indicated by a document ID when the transmitting unit 22 transmits the document ID.

The display controller 29 performs control so that a list of document IDs, a document file to be edited, and so forth received by the receiving unit 28 are displayed on the display mechanism 15.

These functional units are achieved when software and hardware resources operate in cooperation with each other. Specifically, these functional units are achieved when the CPU 11 reads a program for achieving the operation accepting unit 21, the transmitting unit 22, the receiving unit 28, and the display controller 29 from the HDD 13 to the main memory 12, and then executes the program.

Figure 6:
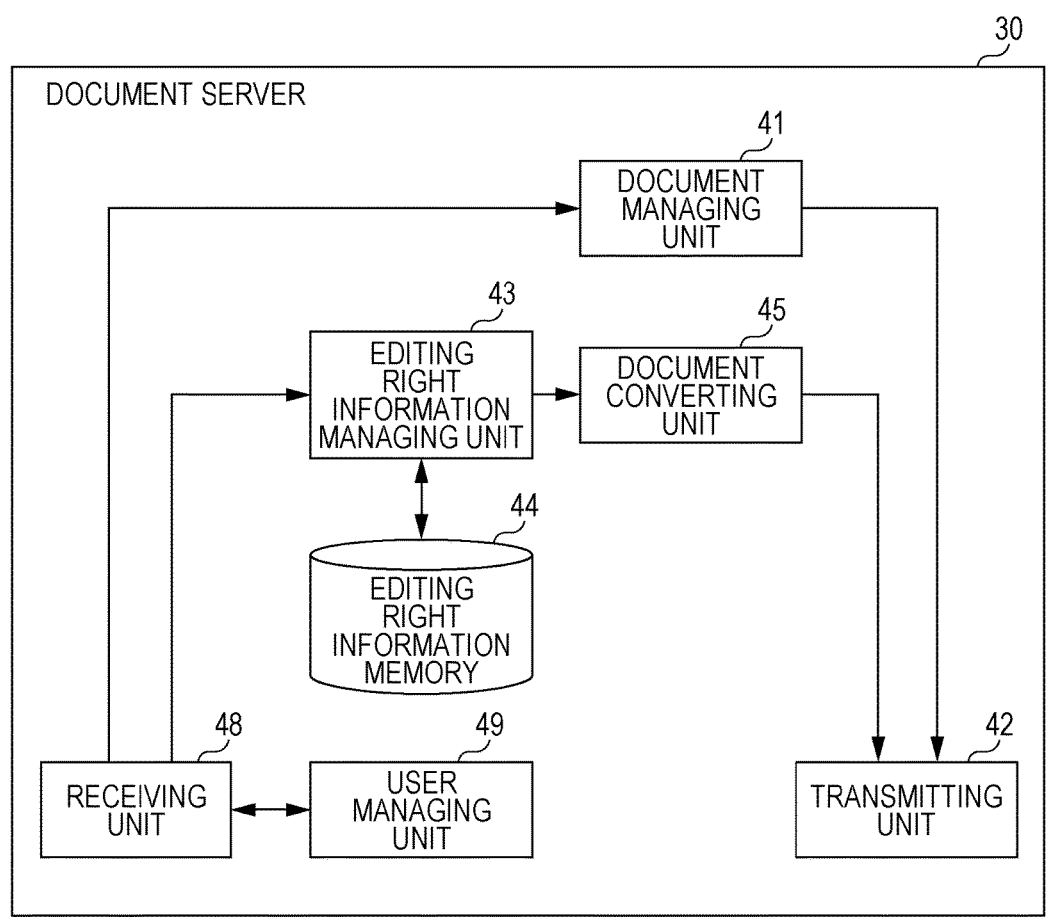
FIG. 6 is a block diagram illustrating an example functional configuration of a document server according to the exemplary embodiment.

FIG. 6 is a block diagram illustrating an example functional configuration of the document server 30.

As illustrated in FIG. 6, the document server 30 includes a document managing unit 41, a transmitting unit 42, an editing right information managing unit 43, an editing right information memory 44, a document converting unit 45, a receiving unit 48, and a user managing unit 49.

The document managing unit 41 manages a document file in a storage site, which is indicated by a document ID, of a document memory (not illustrated). That is, the document managing unit 41 obtains a document file from the document memory or stores a document file in the document memory. Also, the document managing unit 41 manages a document file by associating the document file with a user who is allowed to perform viewing, editing, etc. on the document file. For example, the document managing unit 41 associates user IDs with document IDs, and thereby obtains a document ID of a document file on which a certain user is allowed to perform viewing, editing, etc. When the document converting unit 45 updates a document file to generate a revised document file, the document managing unit 41 stores the revised document file. In the exemplary embodiment, a document file is used as an example of data, and the document managing unit 41 is provided as an example of a data obtaining unit that obtains data.

The transmitting unit 42 transmits, to the client terminal 10, a list of document IDs when the document managing unit 41 obtains the list of document IDs of document files on which a user is allowed to perform viewing, editing, etc., and a document file to be edited, which is a converted document file, when the document converting unit 45 converts the document file in accordance with editing right information.

The editing right information managing unit 43 manages, in the editing right information memory 44, editing right information representing editing rights of individual users for individual document elements in association with the document ID of the document file. In the exemplary embodiment, editing right information is managed in units of pages of a document file. That is, the editing right information managing unit 43 obtains editing right information from the editing right information memory 44 by using a document ID as a key, and stores editing right information in the editing right information memory 44 in association with a document ID.

The editing right information memory 44 stores editing right information in association with a document ID, under the management performed by the editing right information managing unit 43. The editing right information stored in the editing right information memory 44 will be described below.

The document converting unit 45 converts a document file obtained by the document managing unit 41 in accordance with editing right information obtained by the editing right information managing unit 43, thereby generating a document file to be edited. Also, the document converting unit 45 updates a document file obtained by the document managing unit 41 in accordance with the editing right information obtained by the editing right information managing unit 43, a user ID of a user who has edited the document file, and the edited document file, thereby generating a revised document file. In the exemplary embodiment, the document converting unit 45 is provided as an example of an updating unit that updates data in accordance with change information and a controller that performs control so that a portion of data is displayed.

The receiving unit 48 receives, from the client terminal 10, a user ID when a user performs an operation of logging into the document server 30, a document ID of a document file when a user performs an operation of selecting the document file, and a document ID of an original document file and an edited document file when a user performs an operation of transmitting the edited document file to the document server 30. In the exemplary embodiment, the receiving unit 48 is provided as an example of a specifying unit that specifies an operator and a change information obtaining unit that obtains change information, and as an example of a receiving unit that receives identification information and change information and a receiving unit that receives change information.

The user managing unit 49 manages a user ID received by the receiving unit 48. That is, when a user logs into the document server 30, the receiving unit 48 receives a password in addition to a user ID. The user managing unit 49 performs user authentication by determining whether or not a set of the user ID and the password exists among sets of a user ID and a password that are registered in advance. If the user authentication is successfully performed, the user managing unit 49 generates a session ID, and associates the session ID with the user ID. After that, when the receiving unit 48 receives information, which includes the session ID, in a state where the login status of the user continues, the user managing unit 49 transmits the user ID associated with the session ID to the receiving unit 48.

These functional units are achieved when software and hardware resources operate in cooperation with each other. Specifically, these functional units are achieved when the CPU 31 reads a program for achieving the document managing unit 41, the transmitting unit 42, the editing right information managing unit 43, the document converting unit 45, the receiving unit 48, and the user managing unit 49 from the HDD 33 to the memory 32, and executes the program. The editing right information memory 44 is achieved by, for example, the HDD 33.

FIG. 7 is a diagram illustrating an example of editing right information stored in the editing right information memory 44. Here, editing right information for a single document file is illustrated. The editing right information memory 44 actually stores editing right information for plural document files. Each piece of editing right information is associated with a document ID, so as to be identifiable as a piece of editing right information for which document file.

As illustrated in FIG. 7, editing right information includes the items "page", "main editor", and "subeditor". The editing right information illustrated in FIG. 7 corresponds to the editing right information for the third page specified in FIG. 3 with editing right information for the other pages being added.

"Page" is a unit defined by dividing a document file into segments, each having a predetermined number of lines, regardless of semantic content. In this specification, it is assumed that setting is performed in units of pages. Alternatively, for example, setting may be performed in units of segments that are set in view of semantic content, such as a chapter or section of a document file. In this sense, "page" is an example of a portion of data.

"Main editor" is a user who has a right to edit a corresponding page, thereby updating the page. Here, the stored information shows that the main editor of the third page is user B. In the exemplary embodiment, a right of a main editor is used as an example of a first right.

"Subeditor" is a user who has a right to edit a page, thereby adding information representing details of editing. Here, the stored information shows that the subeditors of the third page are user A and user C. In the exemplary embodiment, a right of a subeditor is used as an example of a second right.

The editing right information is initially stored in the editing right information memory 44 when a user who manages the entire document file transmits the editing right information together with the document ID of the document file from the client terminal 10 to the document server 30. The editing right information may be changed after being stored therein. For example, a main editor of a certain page may transfer the right of the main editor of the page to another user, or may add a user as a subeditor of the page.

Next, operation according to the exemplary embodiment will be described.

FIG. 8 is a flowchart illustrating an example of operation of transmitting a document file to be edited performed in the document server 30. The operation illustrated in this flowchart starts when the operation accepting unit 21 of the client terminal 10 accepts an operation of logging into the document server 30 and then the transmitting unit 22 of the client terminal 10 transmits a user ID to the document server 30.

Upon the operation being started, the receiving unit 48 of the document server 30 receives a user ID in step S301. The user ID is managed by the user managing unit 49, and a subsequent access from the same user is recognizable as long as a login status continues.

The receiving unit 48 transmits the user ID to the document managing unit 41. Accordingly, the document managing unit 41 obtains a list of document IDs of document files associated with the user ID, and the transmitting unit 42 transmits the list of document IDs to the client terminal 10 in step S302. Accordingly, in the client terminal 10, the receiving unit 28 receives the list of document IDs, and the display controller 29 performs control so that the list of document IDs is displayed.

Subsequently, in the client terminal 10, the operation accepting unit 21 accepts an operation of selecting, from the list of document IDs, a document ID of a document file on which viewing, editing, etc. are to be performed, and the transmitting unit 22 transmits the selected document ID to the document server 30. Accordingly, the receiving unit 48 of the document server 30 receives the document ID in step S303.

The receiving unit 48 transmits the document ID to the document managing unit 41, and the document managing unit 41 obtains a document file stored in the site indicated by the document ID in step S304. The document file obtained here is transmitted to the document converting unit 45.

Also, the receiving unit 48 transmits the document ID to the editing right information managing unit 43. The editing right information managing unit 43 determines in step S305 whether or not the editing right information associated with the document ID is stored in the editing right information memory 44.

If the editing right information managing unit 43 determines that the editing right information associated with the document ID is stored in the editing right information memory 44, the editing right information managing unit 43 transmits the editing right information to the document converting unit 45. The document converting unit 45 starts a process generating a document file to be edited, in which the document file obtained in step S304 is converted in accordance with the editing right information, so that a document file to be edited is generated. It is assumed that the receiving unit 48 has transmitted the user ID managed by the user managing unit 49 to the document converting unit 45 before this process starts. Also, the document converting unit 45 prepares, in a memory for storing the document file to be edited, the structure of the document file to be edited not including pages.

In the process of generating a document file to be edited, the document converting unit 45 retrieves a page of the document file in step S306. Also, the document converting unit 45 determines in step S307 whether or not the user ID received from the receiving unit 48 is the user ID of a user having an editing right for this page, that is, whether or not the received user ID is the user ID of a main editor or subeditor set to this page in the editing right information.

If it is determined that the received user ID is the user ID of a user having an editing right, that is, the user ID of a main editor or subeditor designated in the editing right information, the document converting unit 45 includes this page into the document file to be edited in step S308. For example, it is assumed that the user ID of user B is received in step S301 and that the third page of a document file to which the editing right information illustrated in FIG. 7 is set is retrieved in step S306. In this case, the third page is included into the document file to be edited. Then, the process proceeds to step S309.

If it is determined in step S307 that the received user ID is not the user ID of a user having an editing right, that is, not the user ID of a main editor or subeditor designated in the editing right information, the page is not included into the document file to be edited, and the process proceeds to step S309.

Subsequently, the document converting unit 45 determines in step S309 whether or not there is another page in the document file.

If it is determined that there is another page, the process returns to step S306. If it is determined that there is not another page, the document converting unit 45 transmits the document file to be edited, which is stored in the memory, to the transmitting unit 42 while maintaining the copy thereof in the memory. The transmitting unit 42 transmits the document file to be edited to the client terminal 10 in step S310. Accordingly, in the client terminal 10, the receiving unit 28 receives the document file to be edited, and the display controller 29 performs control so that the document file to be edited is displayed.

If it is determined in step S305 that the editing right information associated with the document ID is not stored in the editing right information memory 44, the document converting unit 45 transmits the document file obtained in step S304 to the transmitting unit 42, and the transmitting unit 42 transmits the document file to the client terminal 10 in step S311. At this time, the document converting unit 45 instructs the document managing unit 41 to perform exclusive control on this document file so that the other users are not allowed to obtain this document file. Accordingly, in the client terminal 10, the receiving unit 28 receives the document file, and the display controller 29 performs control so that the document file is displayed as an editable document file.

FIG. 9 is a flowchart illustrating an example operation of generating a revised document file performed in the document server 30. After the document file to be edited is displayed through the process illustrated in FIG. 8, the document file is edited in the client terminal 10. Then, the operation accepting unit 21 accepts a user operation of transmitting the edited document file to the document server 30, and the transmitting unit 22 transmits the edited document file and the document ID to the document server 30, and thereby the operation of this flowchart starts.

Upon the operation being started, the receiving unit 48 of the document server 30 receives the document ID and the edited document file in step S321.

The receiving unit 48 transmits the document ID to the document managing unit 41, and thereby the document managing unit 41 obtains the document file stored in the site indicated by the document ID in step S322. The document file obtained here is transmitted to the document converting unit 45.

Also, the receiving unit 48 transmits the document ID to the editing right information managing unit 43. The editing right information managing unit 43 determines in step S323 whether or not the editing right information associated with the document ID is stored in the editing right information memory 44.

If it is determined that the editing right information associated with the document ID is stored in the editing right information memory 44, the editing right information managing unit 43 transmits the editing right information to the document converting unit 45. Then, the document converting unit 45 starts a process of generating a revised document file in which the document file obtained in step S322 is converted in accordance with the editing right information and thereby a revised document file is generated. It is assumed that the receiving unit 48 has transmitted the edited document file received from the client terminal 10 and the user ID managed by the user managing unit 49 to the document converting unit 45 before this process starts.

In the process of generating a revised document file, the document converting unit 45 extracts, in step S324, one or more pages having a difference between the unedited document file stored in the memory in step S310 in FIG. 8 and the edited document file received from the receiving unit 48.

Subsequently, the document converting unit 45 retrieves one of the extracted pages in step S325. The document converting unit 45 determines in step S326 whether or not the user ID received from the receiving unit 48 is the user ID of a user having any editing right for this page, that is, whether the user ID is the user ID of a main editor or subeditor set to this page in the editing right information, or a user ID which is not set to this page in the editing right information. The document file to be edited includes only pages for which a user has an editing right, and thus it is usually impossible that it is determined that the user ID is a user ID which is not set to this page in the editing right information. However, it is possible that the editing right information stored in the editing right information memory 44 is changed while a user is editing the document file by using the client terminal 10, and thus such a determination is performed in view of this case.

If it is determined here that the received user ID is the user ID of a main editor designated in the editing right information, the document converting unit 45 replaces, in step S327, a corresponding page of the document file obtained in step S322 with the page retrieved in step S325. For example, it is assumed that the user ID of user B is received in step S301 in FIG. 8 and that the third page is retrieved in step S325 from among the edited pages of the document file to which the editing right information illustrated in FIG. 7 is set. In this case, the third page of the document file is replaced with the edited third page. Then, the process proceeds to step S329.

If it is determined that the received user ID is the user ID of a subeditor designated in the editing right information, the document converting unit 45 adds, in step S328, the page retrieved in step S325 as the last page of the document file obtained in step S322. At this time, a user ID as an example of first identification information and a page number as an example of second identification information are included into the last page so that it becomes clear that which user has edited which page. For example, it is assumed that the user ID of user A is received in step S301 in FIG. 8, and that the third page is retrieved in step S325 from among the edited pages of the document file to which the editing right information illustrated in FIG. 7 is set. In this case, the edited third page is added to the end of the document file. In this case, according to the exemplary embodiment, the page is added to the end of the document file. Alternatively, the page may be added to the head or middle of the document file. Then, the process proceeds to step S329.

If it is determined that the received user ID is a user ID that is not set to this page in the editing right information, the process proceeds to step S329 without replacement or addition of the page.

Subsequently, the document converting unit 45 determines in step S329 whether or not there is another page in the pages extracted in step S324.

If it is determined that there is another page, the process returns to step S325. If it is determined that there is not another page, the document converting unit 45 transmits the document file at this time as a revised document file to the document managing unit 41, and the document managing unit 41 stores the revised document file in the document memory in step S330. Then, the process ends.

If it is determined in step S323 that the editing right information associated with the document ID is not stored in the editing right information memory 44, the editing right information managing unit 43 notifies the document converting unit 45 of the fact. The document converting unit 45 transmits the edited document file received from the receiving unit 48 to the document managing unit 41. The document managing unit 41 replaces the original document file with the edited document file and stores the edited document file in step S331. At this time, the exclusive control that is set to the document file is canceled. Then, the process ends.

In this example operation, the process is performed so that, when a user displays a document file to be edited, only one or more pages for which the user has an editing right are displayed through filtering.

However, both the pages for which the user has an editing right and the pages for which the user does not have an editing right may be displayed when the user displays the document file to be edited, and a process for distinguishing both types of pages may be performed. Examples of such a process include displaying the pages for which the user does not have an editing right by using a background color of gray, and presenting a message "this page is not editable" with large and bold characters. Here, performing such a process is an example of performing control to display information indicating that a process of updating data in accordance with change information, which represents the details of a change in a portion, is not performed.

Alternatively, a process may be performed so that, when a user displays a document file to be edited, only one or more pages for which the user has a right of a main editor are displayed, or only one or more pages for which the user has a right of a subeditor are displayed. For example, only one or more pages for which the user has a specified right among a right of a main editor and a right of a subeditor may be displayed. This is effective when the user performs work in the procedure of first editing a page for which the user is designated as a main editor and then editing a page for which the user is designated as a subeditor. Here, the right specified by the user among the right of a main editor and the right of a subeditor is an example of a specific right specified from among the first right and the second right.

In the above-described example operation, the client terminal 10 transmits an edited document file, serving as editing information representing the details of editing performed on the document file, to the document server 30. The document server 30 extracts the content of an edited page from the edited document file.

However, the client terminal 10 may store the content of the edited page of the document file, and may transmit the content as editing information to the document server 30, so that the document server 30 may use the editing information. Alternatively, the client terminal 10 may store a history of editing performed on the document file, and may transmit the history as editing information to the document server 30, so that the document server 30 may update the content of an unedited page by using the history to obtain the content of an edited page.

Furthermore, in the above-described example operation, the user logs into the document server 30 to obtain a document file to be edited, edits the document file by using the client terminal 10, and transmits the edited document file to the document server 30 while maintaining a login status.

However, the user may log into the document server 30 to obtain a document file to be edited, log out, edit the document file by using the client terminal 10, and transmit the edited document file to the document server 30 by logging into the document server 30 at another timing. In this case, the flowchart illustrated in FIG. 9 may be changed so that step S301 in FIG. 8 is performed before execution of step S321 and the subsequent steps.

This is the end of the description of the exemplary embodiment.

In the above-described exemplary embodiment, the client terminal 10 transmits editing information (for example, an edited document file) to the document server 30 when updating a document file stored in the document server 30. Alternatively, a document file may be updated in response to an explicit instruction at an arbitrary time point after editing information has been transmitted to the document server 30. For example, editing information may be transmitted upon pressing of a button for transmitting the editing information, and the document file may be updated in accordance with the editing information. Alternatively, a special button for updating a document file may be provided, and the document file may be updated in accordance with already transmitted editing information upon pressing of the special button. Alternatively, the document file may be updated in accordance with editing information upon a predetermined update operation being performed by a user as an operation of updating data in accordance with change information.

In the above-described exemplary embodiment, the client terminal 10 transmits a document ID to the document server 30, the document server 30 generates a document file to be edited and transmits the document file to the client terminal 10, the client terminal 10 transmits an edited document file to the document server 30, and the document server 30 generates a revised document file and stores it. Alternatively, for example, the client terminal 10 may generate a document file to be edited upon input of a document ID, or may generate and store a revised document file after a document file has been edited. In this case, the client terminal 10 includes a document file obtaining unit (not illustrated) as an example of a data obtaining unit that obtains a document file, a user specifying unit (not illustrated) as an example of a specifying unit that specifies a user, an editing information obtaining unit (not illustrated) as an example of a change information obtaining unit that obtains editing information, a document file updating unit (not illustrated) as an example of an updating unit that updates a document file when an update operation is performed by a user, and the display controller 29 as an example of a controller that performs control so that a page of a document file is displayed when a display operation is performed by a user.

In the above-described exemplary embodiment, the document server 30 stores editing right information as a file separated from a document file, and stores information for associating the editing right information with a document ID, thereby associating the document file with the editing right information. Alternatively, for example, the document server 30 may associate a document file with editing right information by adding the editing right information as attribute information to the document file.

A program for realizing the exemplary embodiment may be provided by being stored in a recording medium, such as a compact disc-read only memory (CD-ROM), as well as be provided through a communication medium. In this case, the program causing the process illustrated in FIG. 8 to be executed and the program causing the process illustrated in FIG. 9 to be executed may be provided by being stored in the same recording medium, or may be provided by being stored in individual recording media.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A data processing apparatus comprising at least one central processing unit (CPU) configured to:
   receive a plurality of user operations for changing a same portion of a document;
   wherein, in response to a user operation of the plurality of user operations being made by a first user who has a first level, revising the document to reflect the change to the portion of the document, and in response to a user operation of the plurality of user operations being made by a second user who has a second level that is different than the first level, changing the portion of the document according to the user operation and not revising the document to reflect the change to the portion of the document but adding the portion of the document that has been changed to another portion of the document.

2. The data processing apparatus according to claim 1, wherein the user operation includes at least one of add, delete, replace, or move.

3. The data processing apparatus according to claim 2, wherein:
   in response to an operation of displaying the document being performed by a user, the at least one CPU performs control to display the portion of the document if the user has the first level or to display the another portion of the document if the user has the second level, and performs control to not display the portion of the document or the another portion of the document if the user does not have any of the first level and the second level.

4. The data processing apparatus according to claim 2, wherein:
in response to an operation of displaying the document being performed by a user, the at least one CPU performs control to display the portion of the document if the user has the first level or to display the another portion of the document if the user has the second level, and performs control to display a notification and the portion of the document if the user does not have any of the first level and the second level, the notification indicating that a process of updating the document is not performed.

5. The data processing apparatus according to claim 2, wherein:
in response to an operation of displaying the document being performed by a user and the user specifying the first level or the second level, the at least one CPU performs control to display the portion of the document if the user has the first level that is specified or to display the another portion of the document if the user has the second level that is specified, and performs control to not display the portion or the another portion of the document data if the user does not have the specific level that is specified.

6. The data processing apparatus according to claim 1, wherein the plurality of user operations comprise a first user operation made by the first user, and a second user operation made by the second user, and
wherein the updates to the document by the first user and the second user are performed concurrently.

7. The data processing apparatus according to claim 1, wherein the same portion of the document is a page of the document.

8. The data processing apparatus according to claim 1, wherein the first level is a main editor, and the second level is a sub-editor.

9. The data processing apparatus according to claim 1, wherein, in response to the user operation being made by the first user who has the first level, the portion of the document is changed according to the user operation and the document is updated to reflect the change.

10. A server comprising:
a storage that stores a document; and
at least one central processing unit (CPU) configured to:
receive a plurality of user operations for changing a same portion of the document, each including identification information identifying a user who performs the user operation and change information indicating a change of the same portion of the document indicated by the user operation, and
in response to the identification information indicating a user who has a first level, revising the document to reflect the change to the portion of the document indicated by the change information, and in response to the identification information indicating a user who has a second level that is different than the first level, changing the portion of the document according to the user operation and not revising the document to reflect the change to the portion of the document but adding the portion of the document that has been changed to another portion of the document.

11. The data processing system according to claim 10, wherein the user operation includes at least one of add, delete, replace, or move.

12. A method comprising:
receiving a plurality of user operations for changing a same portion of a document;
in response to a user operation being made by a first user who has a first level, revising the document to reflect the change to the portion of the document, and
in response to the user operation being made by a second user who has a second level that is different than the first level, changing the portion of the document according to the user operation and not revising the document to reflect the change to the portion of the document but adding the portion of the document that has been changed to another portion of the document.

13. The method according to claim 12, wherein the user operation includes at least one of add, delete, replace, or move.

14. The method according to claim 12, wherein the updates to the document are performed concurrently.

15. The method according to claim 12, wherein the first level is a main editor, and the second level is a sub-editor.

16. A non-transitory computer readable medium storing a program causing a computer to execute a process, the process comprising:
receiving a plurality of user operations for changing a same portion of a document;
in response to the user operation being made by a first user who has a first level, revising the document to reflect the change to the portion of the document, and
in response to the user operation being made by a second user who has a second level that is different than the first level, changing the portion of the document according to the user operation and not revising the document to reflect the change to the portion of the document but adding the portion of the document that has been changed to another portion of the document.

17. The non-transitory computer readable medium according to claim 16, wherein the user operation includes at least one of add, delete, replace, or move.

18. The non-transitory computer readable medium according to claim 16, wherein the updates to the document are performed concurrently.

19. The non-transitory computer readable medium according to claim 16, wherein the first level is a main editor, and the second level is a sub-editor.

20. A data processing apparatus comprising at least one central processing unit (CPU) configured to:
receive in parallel a first user operation from a first user for changing a portion of a document and a second user operation from a second user for changing the same portion of the document;
wherein, in response to the first user being a main editor, revising the document to reflect the change to the portion of the document according to the first user operation, and in response to the second user being a sub-editor, updating the document by adding the portion of the document that has been changed according to the second user operation to another portion of the document.

* * * * *